US008102814B2

(12) United States Patent
Rahman et al.

(10) Patent No.: US 8,102,814 B2
(45) Date of Patent: Jan. 24, 2012

(54) ACCESS POINT PROFILE FOR A MESH ACCESS POINT IN A WIRELESS MESH NETWORK

(75) Inventors: Shahriar I. Rahman, Morgan Hill, CA (US); Nancy Cam-Winget, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 990 days.

(21) Appl. No.: 11/559,551

(22) Filed: Nov. 14, 2006

(65) Prior Publication Data

US 2008/0112363 A1  May 15, 2008

(51) Int. Cl.
*H04W 4/00* (2009.01)

(52) U.S. Cl. ........................................ 370/331; 370/328

(58) Field of Classification Search .................. 370/338, 370/256, 328, 401; 410/100, 117, 97; 455/11; 604/175; 606/151, 213, 232
See application file for complete search history.

(56) References Cited

U.S. PATENT DOCUMENTS

| 7,505,751 | B1* | 3/2009 | Backes | 455/332 |
| 7,856,001 | B2* | 12/2010 | Hares et al. | 370/338 |
| 7,991,007 | B2* | 8/2011 | Agarwal et al. | 370/474 |
| 2005/0153725 | A1* | 7/2005 | Naghian et al. | 455/520 |
| 2005/0260973 | A1* | 11/2005 | van de Groenendaal | 455/411 |
| 2006/0160533 | A1* | 7/2006 | Chou et al. | 455/422.1 |
| 2006/0183462 | A1* | 8/2006 | Kolehmainen | 455/411 |
| 2006/0209773 | A1* | 9/2006 | Hundal et al. | 370/338 |
| 2006/0215582 | A1* | 9/2006 | Castagnoli et al. | 370/254 |
| 2006/0268802 | A1* | 11/2006 | Faccin | 370/338 |
| 2006/0285529 | A1* | 12/2006 | Hares et al. | 370/338 |
| 2008/0077710 | A1* | 3/2008 | Kouvelas et al. | 709/250 |
| 2008/0170550 | A1* | 7/2008 | Liu et al. | 370/338 |
| 2009/0109897 | A1* | 4/2009 | Woo | 370/328 |

OTHER PUBLICATIONS

"FAQ: Overview of 802.1x and Cisco IBNS Technology," Cisco Systems, San Jose, CA, 2004, pp. 1-6. Downloaded Oct. 10, 2006 at: http://www.cisco.com/application/pdf/en/us/guest/netsol/ns75/c685/ccmigration_09186a0080258e2f.pdf.
"Identify-Based Networking Systems Configuration Guide," Cisco Systems, San Jose, CA, version 1.0, Dec. 2005. Downloaded Oct. 10, 2006 at: http://www.cisco.com/application/pdf/en/us/guest/netsol/ns656/c654/ccmigration_09186a00805eea83.pdf.

* cited by examiner

*Primary Examiner* — Nick Corsaro
*Assistant Examiner* — Mahendra Patel
(74) *Attorney, Agent, or Firm* — Dov Rosenfeld; INVENTEK

(57) ABSTRACT

A mesh access point that includes an access point profile storing one ore more parameters in non-volatile memory, and a method of using the mesh access point having the access point profile to select and carry out mutual authentication on a wireless mesh network to establish itself to the mesh network using information in the access point profile, and further to provide services to wireless clients according to information in the access point profile. Access point profiles can be pre-configured/configured/updated suitably in order to adapt the mesh access point in a mesh network according to its capabilities and requirements.

29 Claims, 6 Drawing Sheets

ACCESS POINT PROFILE FOR A MESH ACCESS POINT IN A WIRELESS MESH NETWORK

TECHNICAL BACKGROUND

The present disclosure is related generally to wireless packet networks.

BACKGROUND

Wireless mesh networks are becoming common, e.g., in an outdoor environment for providing so-called hot spots for wireless local area networks (WLANs) conforming to the IEEE 802.11 standard. In a wireless mesh network, a set of mesh nodes are coupled by a backhaul network that typically forms a tree topology, with one mesh node being the root of the tree topology, and coupled to a wired network that, for example, is coupled to the Internet. Some mesh nodes may also act as an access point (AP) so that one or more client stations may associate with them, and such a mesh node is called a mesh AP. Without loss of generality, each mesh node can be called a mesh AP. A non-AP mesh node, e.g., one that acts as a relay in the backhaul network, can simply be thought of as a mesh AP with the mesh AP functionality turned off. One mesh AP is the root mesh node, and such a mesh node is called the root AP herein.

Different mesh networks may be deployed in geographical proximity but by different administrative sites. For such situations, it is advantageous to uniquely identify these deployments. For example, consider a first mesh network in a first administrative domain, e.g., of a Wal-Mart store, and a second mesh network within signal strength proximity of the first mesh network, but in a second administrative domain, e.g., that of a Target store. It would be advantageous to be able to uniquely identify each of these administrative domains. A child Mesh AP attempting to establish membership to a mesh network should be able to distinguish the mesh network it should join from other networks, e.g., a Wal-Mart child Mesh AP should be able to distinguish Wal-Mart's mesh network from Target's, and also from public ones in its radio range. Furthermore, a child mesh AP should be provisioned with further policies to filter and ensure proper mesh services from a parent. Such policies may be required to ensure that the child mesh AP links with parent APs that can provide the services enforced by the child, for instance ensuring that no downgrade attacks are possible by only linking with potential parents that support appropriate security services, for example, AES-CCM and 802.1X authentication.

SUMMARY

Described herein is a mesh access point that includes an access point profile storing one ore more parameters in non-volatile memory, and a method of using the mesh access point having the access point profile to select and carry out mutual authentication on a wireless mesh network. Access point profiles can be pre-configured/configured/updated suitably in order to adapt the mesh access point in a mesh network according to its capabilities and requirements.

One particular embodiment includes a method comprising receiving in a mesh access point one or more advertisements from one or more potential parent mesh access points of at least one wireless mesh network, each mesh network having a mesh network identifier, each advertisement including the mesh network identifier. The method further comprises selecting a particular wireless mesh network and a particular parent mesh access point of the particular wireless mesh network, the selecting using one or more parameters stored in an access point profile in the mesh access point. The method further comprises setting up a physical radio link with a particular parent mesh access point, e.g., as a result of the receiving an advertisement from the particular patent mesh access point as a child mesh access point. The method further comprises requesting association with the particular parent mesh access point as a potential child mesh access point of the particular parent mesh access point, the requesting using one or more parameters in the access point profile; and receiving a response to the association request. The method includes, in the case that the received response is positive, using one or more policies stored in the in the access point profile to join the particular wireless mesh network via the particular parent mesh access point.

In one embodiment the one or more policies include an indication of whether or not mutual authentication is required, and in the case the indication is that authentication is required, the using one or more policies to join includes mutual authenticating starting with credential information stored in the access point profile.

In one embodiment, the access point profile is provisioned directly, e.g., manually by joining a mesh network. In one particular embodiment, the access point profile is incrementally provisioned by having joined one or more mesh networks in the part.

In one embodiment of the method, the access point profile includes one or more entries for an indication of wireless mesh networks that the mesh access point has previously joined, and one or more parameters on such previously joined mesh networks.

In one embodiment, the advertisement includes information one or more parameters advertising at least one security capability supported by the advertising mesh access point, e.g., Advanced Encryption Standard (AES) encryption (AES-CCM), TKIP encryption based on transient keys, and so forth, and in one such embodiment, the selecting of the particular wireless mesh network and the particular parent mesh access point includes using information from the received advertisement.

In one embodiment of the method, the selecting of the particular wireless mesh network and the particular parent mesh access point includes using information from the access point profile to ascertain if the particular wireless mesh network and a particular parent mesh access point can provide the services required.

A particular embodiment includes a method comprising transmitting in a potential parent mesh access point of a wireless mesh network one or more advertisements, the mesh network having a mesh network identifier, each advertisement including the mesh network identifier and one or more parameters determined from content stored in an access point profile in the mesh access point. The method includes setting up a physical radio link between the potential parent mesh access point and a particular child mesh access point as a result of the child mesh access point receiving one of the advertisements; receiving an association request from the particular child mesh access point as a potential child mesh access point of the potential parent mesh access point, ascertaining, using one or more parameters stored in the access point profile whether or not the child mesh access point can join the mesh network with the mesh access point being the parent mesh access point of the particular child mesh access point; and sending a response to the association request.

One particular embodiment of the invention includes an apparatus comprising: at least one a backhaul radio interface;

a control processor coupled to the backhaul radio interface operative with the radio interface to connect to one or more mesh nodes to form a wireless mesh network; and a nonvolatile memory coupled to or residing in the control processor, and usable by the control processor, the non volatile memory including an access point profile operable to store one or more parameters usable by the processor to join a particular mesh network as a mesh access point that is a child mesh access point to a particular parent mesh access point. In one embodiment, the one or more parameters include security information. In one embodiment, the security information includes an indication of whether mutual authentication is required for the process of joining, and further, in the case the indication is that mutual authentication is required, credential information to use in the process of mutual authentication.

One particular embodiment of the invention includes logic encoded in one or more tangible media for execution and when executed operable to receive in a mesh access point one or more advertisements from one or more potential parent mesh access points of at least one wireless mesh network, each mesh network having a mesh network identifier, each advertisement including the mesh network identifier, and select a particular wireless mesh network and a particular parent mesh access point of the particular wireless mesh network, the selecting using one or more parameters stored in an access point profile in the mesh access point. The logic is further operable when executed to: set up a physical radio link with a particular parent mesh access point as a child mesh access point; request association with the particular parent mesh access point as a potential child mesh access point of the particular parent mesh access point, the requesting using one or more parameters in the access point profile; receive a response to the association request; and, in the case that the received response is positive, the particular wireless mesh network via the particular parent mesh access point, the joining using information stored in the access point profile.

In one embodiment the one or more parameters in the access point profile include security information. In one embodiment, the security information includes an indication of whether mutual authentication is required for the process of joining, and further, in the case the indication is that mutual authentication is required, credential information to use in the process of mutual authentication, e.g., information stored in the access point profile to determine which credential, e.g., which X.509 certificate or key to use during the authentication.

In one embodiment, the advertisements include one or more parameters advertising which security capabilities are supported, e.g., AES-CCM vs. TKIP, and so forth.

One particular embodiment of the invention includes an apparatus comprising: means for receiving a wireless signal transmitted in a wireless mesh; means for processing signals received and operative with the means for receiving to connect to one or more mesh nodes to form a wireless mesh network; and means for storing one or more parameters usable by the means for processing to join a particular mesh network as a mesh access point that is a child mesh access point to a particular parent mesh access point.

In one embodiment the one or more parameters in the access point profile include security information. In one embodiment, the security information includes an indication of whether mutual authentication is required for the process of joining, and further, in the case the indication is that mutual authentication is required, credential information to use in the process of mutual authentication, e.g., information stored in the access point profile to determine which credential, e.g., which X.509 certificate or key to use during the authentication.

One particular embodiment of the invention includes a method comprising: transmitting in a mesh access point of a wireless mesh network one or more beacon frames to advertise the mesh APs capabilities for servicing wireless clients. Each beacon frame includes one or more parameters determined from content stored in an access point profile in the mesh access point. The method includes setting up a physical radio link with a particular wireless client as a result of the particular wireless client receiving one of the beacon frames, receiving an association request from the wireless client to become of client of the mesh access point, ascertaining, e.g., using one or more parameters stored in the access point profile whether or not the wireless client can associate with mesh access point; and sending a response to the association request.

DESCRIPTION OF EXAMPLE EMBODIMENTS

Described herein is a method and a system that, when operative, enables a child mesh AP to only join its proper "mesh network," and further to deploy the appropriate services when part of such a proper mesh network. The method includes storing in an AP an "access point profile" (AP profile) that defines capabilities such as a security profile, also called the security sub-profile, that allows the AP to join mesh networks, e.g., those having one or more specified properties, and allows a potential mesh network to identify and authenticate the potential child mesh AP, and so forth.

In one embodiment, the AP profile also includes one or more other capability parameters, e.g., a quality of service (QoS) sub-profile that describes the QoS capabilities and/or requirements of a potential mesh AP. In one embodiment, the AP profile also includes, e.g., as an option, a mobility sub-profile. In one embodiment, the AP profile also includes, e.g., as an option, a management sub-profile. In one embodiment, the AP profile also includes, e.g., as an option, profile elements such as the type of AP and/or the role the AP can play in the mesh network. Some embodiments include one of more of these sub-profiles in the AP profile.

Mesh Network

Figure 1:
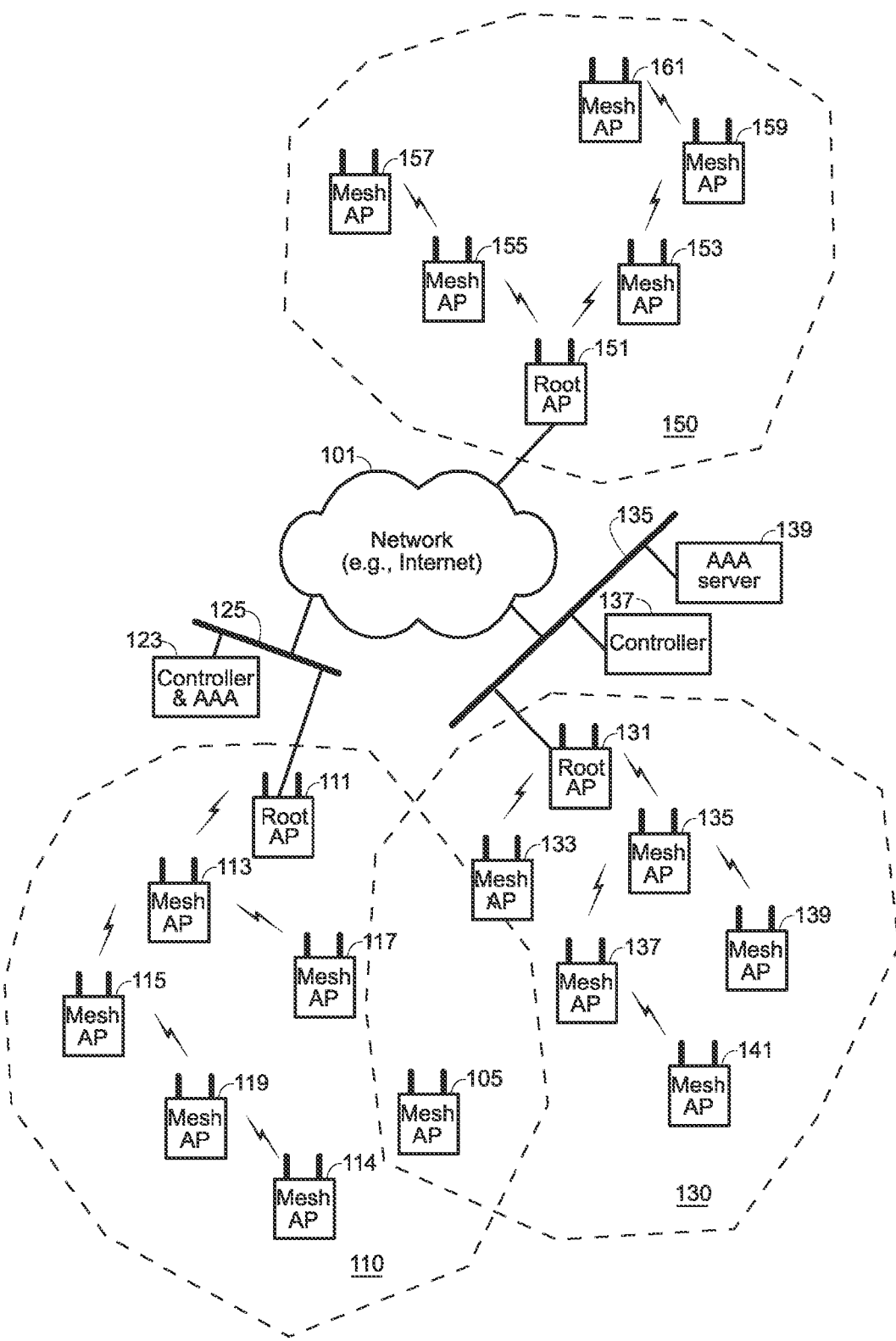
FIG. 1 shows an environment of several mesh networks.

FIG. 1 shows an example environment in which one or more embodiments of the present invention can operate. FIG. 1 shows three mesh networks 110, 130, and 150 each coupled to a network 101, e.g., the Internet. Mesh networks 110, 130, and 150 each include mesh nodes including a root AP and at least one other mesh APs.

As an example, mesh network 110 includes a root AP 111 and several other mesh APs 113, 114, 115, 117, 119 that, in a backhaul network, form a tree topology in which the root AP 111 is the root. The root AP is connected to a wired network 125 that is connected to the network 101. In one embodiment, the mesh network is controlled by a controller 123 that is also coupled to the wired network 125. In the example, the mesh nodes are lightweight APs whose AP functionality is controlled by a controller, e.g., the controller 123. In different embodiments, a controller can be operative to control more than one function, so, in this example, the controller 123 is operative to control the mesh network, and further to control the AP functionality of one or more of the mesh APs including the root AP 111 and the other mesh APs 113, 114, 115, 117, 119. In one embodiment, Cisco's Lightweight Access Point Protocol (LWAPP) is used between each mesh AP and the controller of the respective mesh AP to control the AP functionality of the mesh AP. LWAPP would be known to those in the art. A version of LWAPP is being standardized (2006) as an IETF draft under the name of Control And Provisioning of Wireless Access Points (CAPWAP) Protocol. See www.capwap.org. Such AP functionality controlled using LWAPP in one embodiment includes authentication between a mesh AP and the controller 123 of the mesh AP in relation to a mesh AP providing service to endpoints, that is, to client stations. An authentication server, e.g., an authentication authorization and accounting (AAA) server is included for such authentication. In this example, the controller 123 is further operative to provide the functionality of an authentication server, e.g., AAA server for the mesh network.

Mesh network 130, for example, includes a root AP 131 and several other mesh APs 133, 125, 137, 139 and 141 that, in a backhaul network, form a tree topology in which the root AP 131 is the root. Mesh network 150, for example, includes a root AP 151 and several other mesh APs 153, 155, 157, 159, 161 that, in a backhaul network, form a tree topology in which the root AP 151 is the root. In the case of mesh network 130, the root AP 131 is connected to a wired network 135 that is connected to the network 101. In one embodiment, the mesh network 130 is controlled by a controller 137 that is also coupled to the wired network 135. All mesh points are assumed lightweight mesh APs, and the controller 137 is also operative to control the AP functionality of one or more of the mesh APs including the root AP 131 and the mesh APs 133. Authentication is aided by a separate AAA server 139 coupled to the wired network 135.

Each mesh node can operate as a relay mesh node without AP functionality. Without loss of generality, a mesh node that has no AP functionality is still referred to as a mesh AP herein.

Not shown in FIG. 1 are domain name (DNS) server(s), DHCP server(s), and other servers that might be included in an actual deployment. Those in the art will understand that such servers can optionally be included, and how to include such servers would be clear to those in the art and will not be further explained herein Also not shown are such network elements as switches and routers, and again, those in the art will understand that a wired network connection, say, between a root AP and a controller, might include many network elements such as switches and routers.

Consider a mesh AP 105 wishing to join an appropriate mesh network. One embodiment of the invention includes configuring a mesh AP such as mesh AP 105 so that it includes an AP profile that has in it information that aids in the mesh AP's joining the appropriate mesh network.

Figure 2:
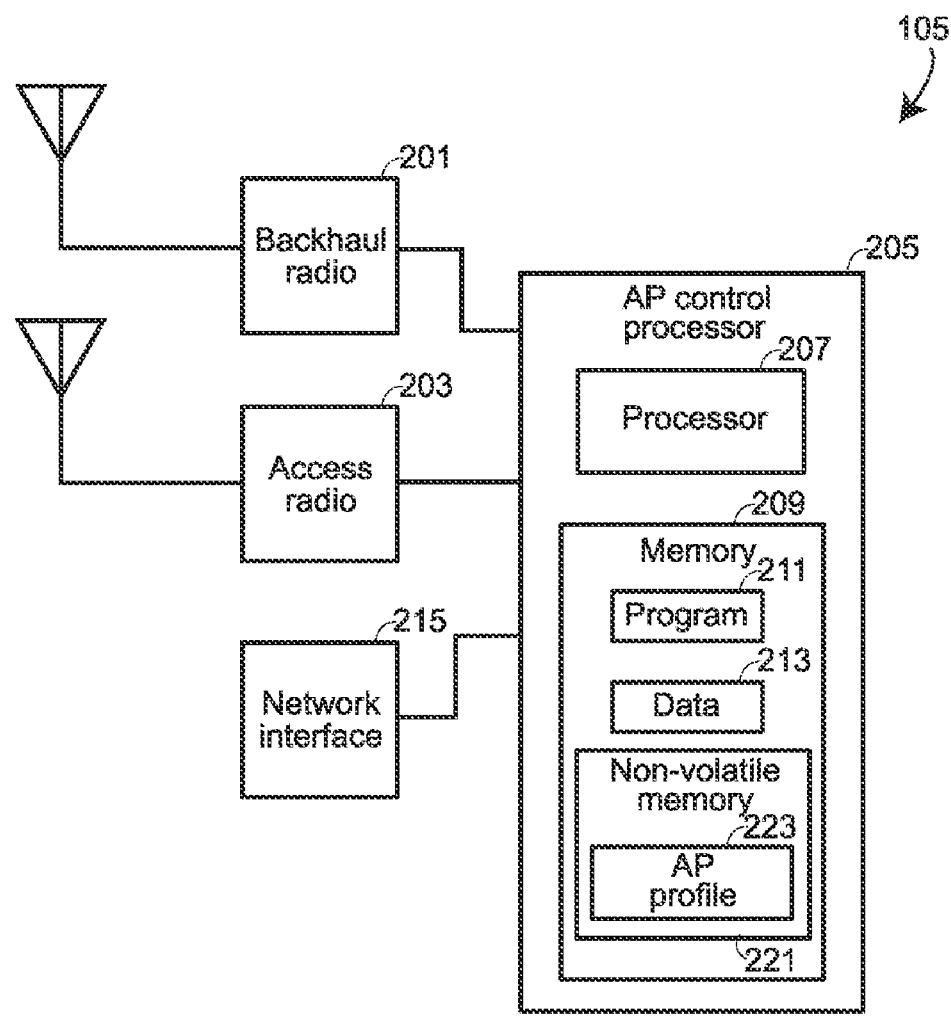
FIG. 2 shows a simplified block diagram of one example mesh access point that includes a mesh profile according to one or more embodiments of the present invention.

FIG. 2 shows an example mesh AP, say mesh AP 105 that includes a backhaul radio interface 201 operative to connect to other mesh nodes to form a wireless mesh network, an access radio interface 203 operative to connect to one or more client stations, and an AP control processor 205 to which the backhaul and access radio interfaces are coupled. In one embodiment, the backhaul radio operates on a different frequency band than the access radio interface. In particular, the backhaul radio interface 201 is operative to communicate according to the IEEE 802.11a standard in the approximately 5 GHz band, and the access radio interface 203 is operative to communicate according to the IEEE 802.11b,g standard in the approximately 2.4 GHz band. Each radio interface includes a respective set of one or more antennas. In an alternate embodiment, the same radio band, and even the same physical radio is used for both backhaul communication with other mesh AP(s), and for access communication with any client stations of the mesh AP 105 when the mesh AP is part of a mesh network.

The AP control processor 205 includes a programmable processor 207 and a memory 209. One or more features of the present invention operate in a mesh AP, and are embodied in the form of software programs 211 in the memory. Furthermore, one or more configuration parameters are stored in the memory 209 as data 213. The mesh AP 105 includes a non-volatile memory 221. In one embodiment, the non-volatile memory includes an AP profile 223 for the mesh AP. In one embodiment, the non-volatile memory also include the authentication credential for the mesh AP, e.g., an X.509 certificate, a key or a username/password. The non-volatile storage for this authentication credential is in one embodiment secure.

Some versions of a mesh AP include a wired network interface 215 that enable the mesh AP to connect to a wired network, e.g., to operate as a root AP, and further, to connect to a wired network for the purpose of managing the AP profile 223.

Some mesh nodes do not include the access radio and cannot operate as APs, but can act as mesh nodes in the backhaul mesh network. Such devices are still called mesh APs herein, as they are equivalent to a mesh AP whose access radio is off. There is no loss of generality in this.

In one embodiment, each mesh network includes a mesh network identifier, called herein a "mesh domain ID."

The access point profile (AP profile) 223 in a mesh AP such as mesh AP 105 includes a security sub-profile that includes one or more entries for an indication of one or more different security policies that the mesh access point can support. In one embodiment, the security sub-profile includes security policies e.g., in the form of an indication, e.g., as a list of different security policies that the mesh access point 105 can support for establishing itself in a mesh network. The security sub-profile further may include security policies, e.g., in the form of an indication, e.g., as a list of different security policies that the AP 105 can support when servicing client stations.

With respect to policies for establishing the mesh AP in a mesh network, the information in the AP profile includes such information an indication of whether or not mutual authentication and mesh security is required, and in the case authentication is required, credential information to initially use for authenticating, and also such as controller connection policies, e.g., whether the AP can join any controller, or whether the AP can only join controllers identified by name or MAC/IP. In the latter case, when a controller architecture is imposed, the security sub-profile includes one or more entries for identifying information for the specific controllers. The AP profile may optionally include an indication, e.g., as a list of allowed and/or not-allowed wireless mesh networks that the mesh network may and/or may not join, and one or more parameters on such mesh networks. In one embodiment, whether a particular mesh network is allowed or not is ascertained from one or more parameters stored in the AP profile. The security sub-profile further may include credential information on where to find the key or keys, e.g., the certificate or certificates, e.g., the root certificate(s) to use, for authenticating for each allowed network.

The AP profile may optionally include an indication, e.g., as a list of wireless mesh networks that the mesh network has previously joined, and one or more parameters on such mesh networks.

Figure 3:
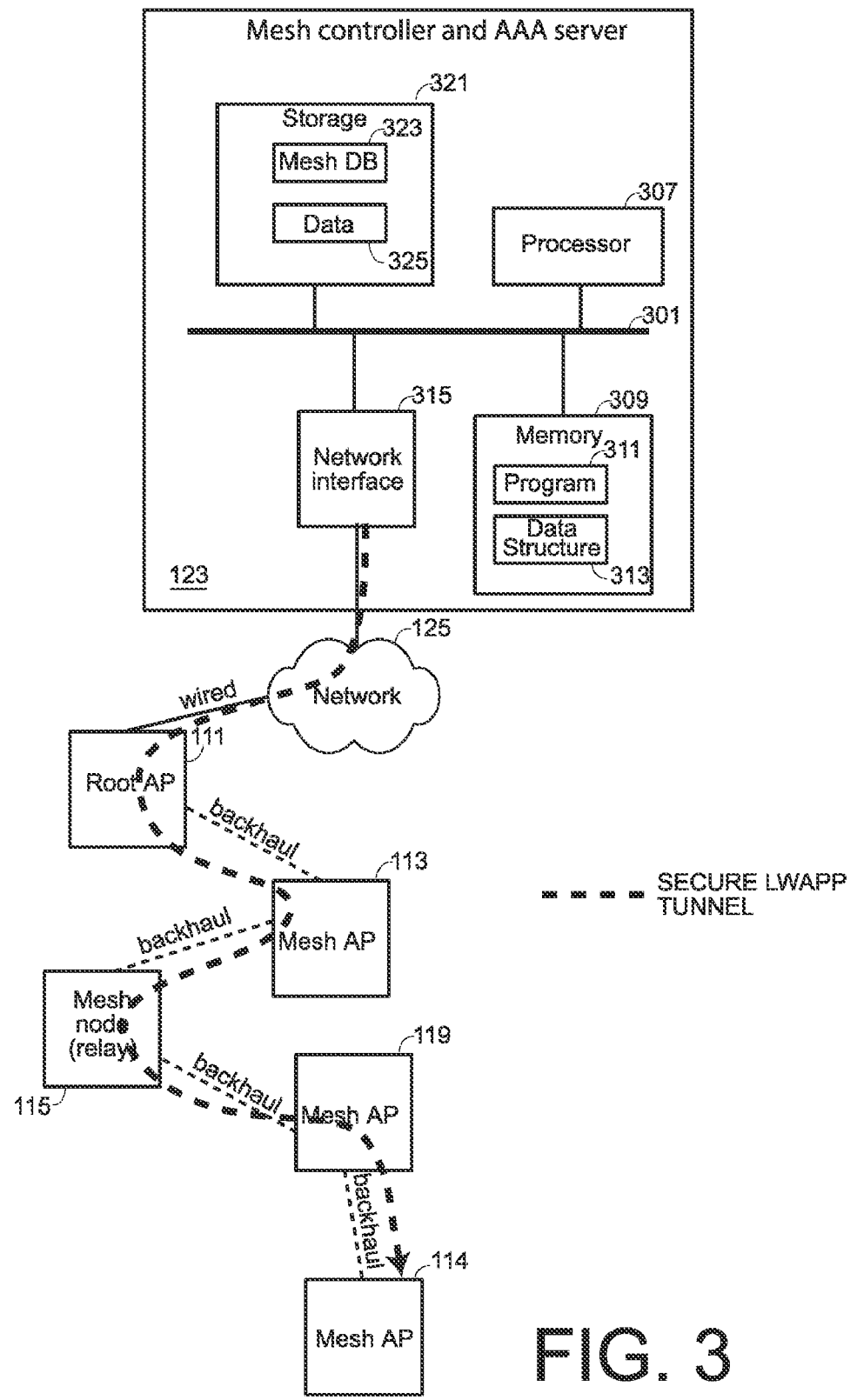
FIG. 3 shows part of one of the mesh networks of FIG. 1 with a block diagram of an example mesh controller to control operation of the mesh network.

FIG. 3 shows part of the mesh network 110 with an example mesh controller 123 to control operation of the mesh network 110. FIG. 3 shows some of the elements of the controller 123 that also includes an AAA server. In one embodiment, the controller and AAA server functionalities are implemented in the form of software stored in and executing in at least one processor of a processing system. The mesh controller 123 (including the AAA server) includes at least one programmable processor 307, a memory 309, a storage subsystem 321, and a network interface 315, all coupled via a bus structure 301, which, for simplicity, is shown as a simple bus. Some of the features of the present invention operate on the mesh controller 123, and include software shown as program 311 stored in memory 309. The mesh controller maintains a mesh data structure 313 that includes information on the tree topology of the backhaul network, such a mesh data structure shown for simplicity in memory 309. The mesh data structure may use information stored in the storage subsystem 321, such information shown as a mesh database 323. Other data 325 is shown included in storage 321, and includes, for example, information on each mesh AP that is part if the network As can be seen, each mesh AP that is part of the mesh network 110 has a secure LWAPP tunnel to the controller 123. For example, mesh AP 114 has a secure LWAPP tunnel to the controller 123 via the intermediate mesh APs 113, 115, 117, 119 to the root AP 111 and via the wired network 125. The secure LWAPP tunnel is shown by the (relatively thick) broken line ending in the arrow to the mesh AP 114.

Discovery and Authentication Phases of a Mesh AP Joining a Mesh

Figure 4:
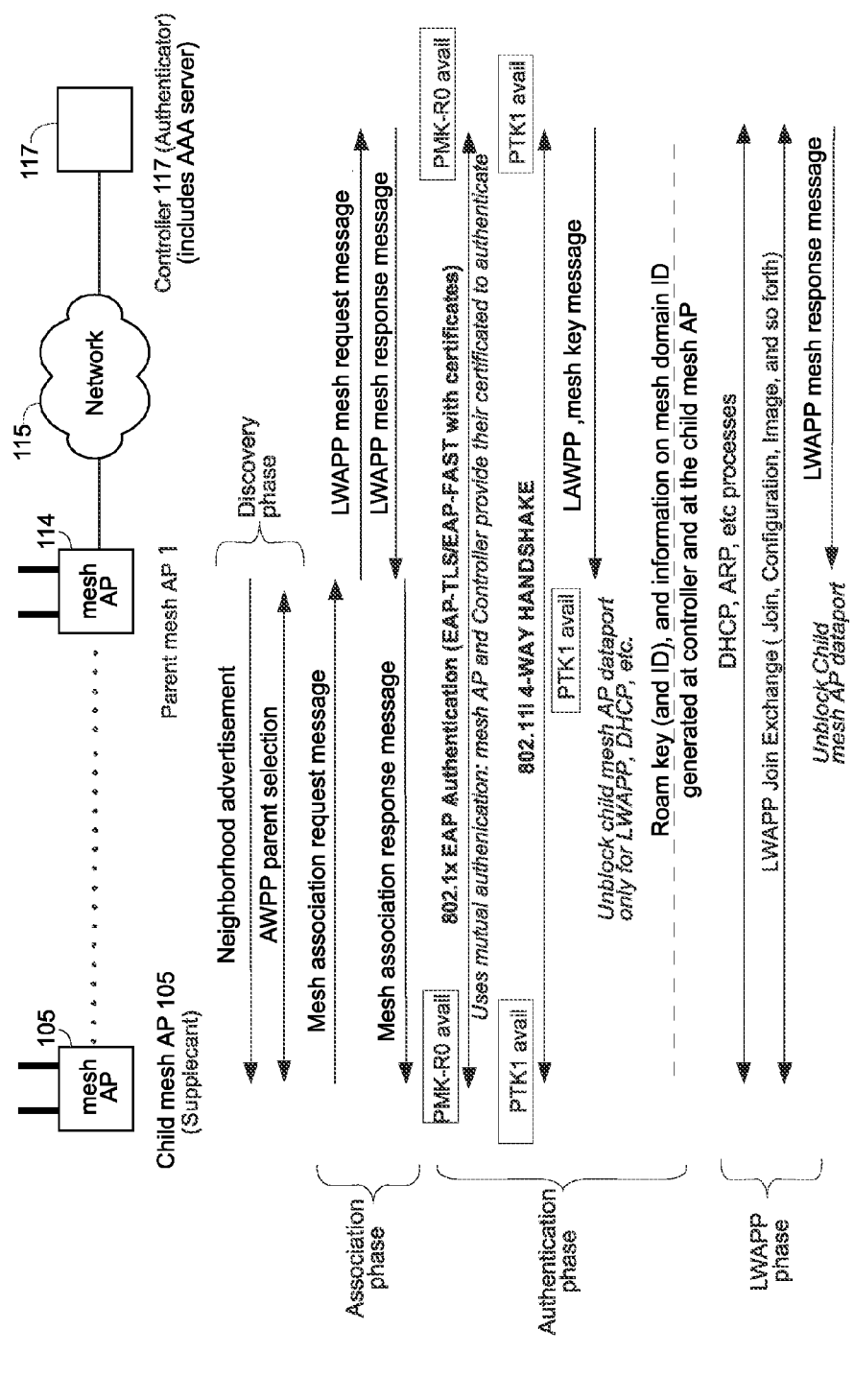
FIG. 4 shows messaging according to one embodiment of a potential child mesh AP joining an existing mesh network.
Figure 5:
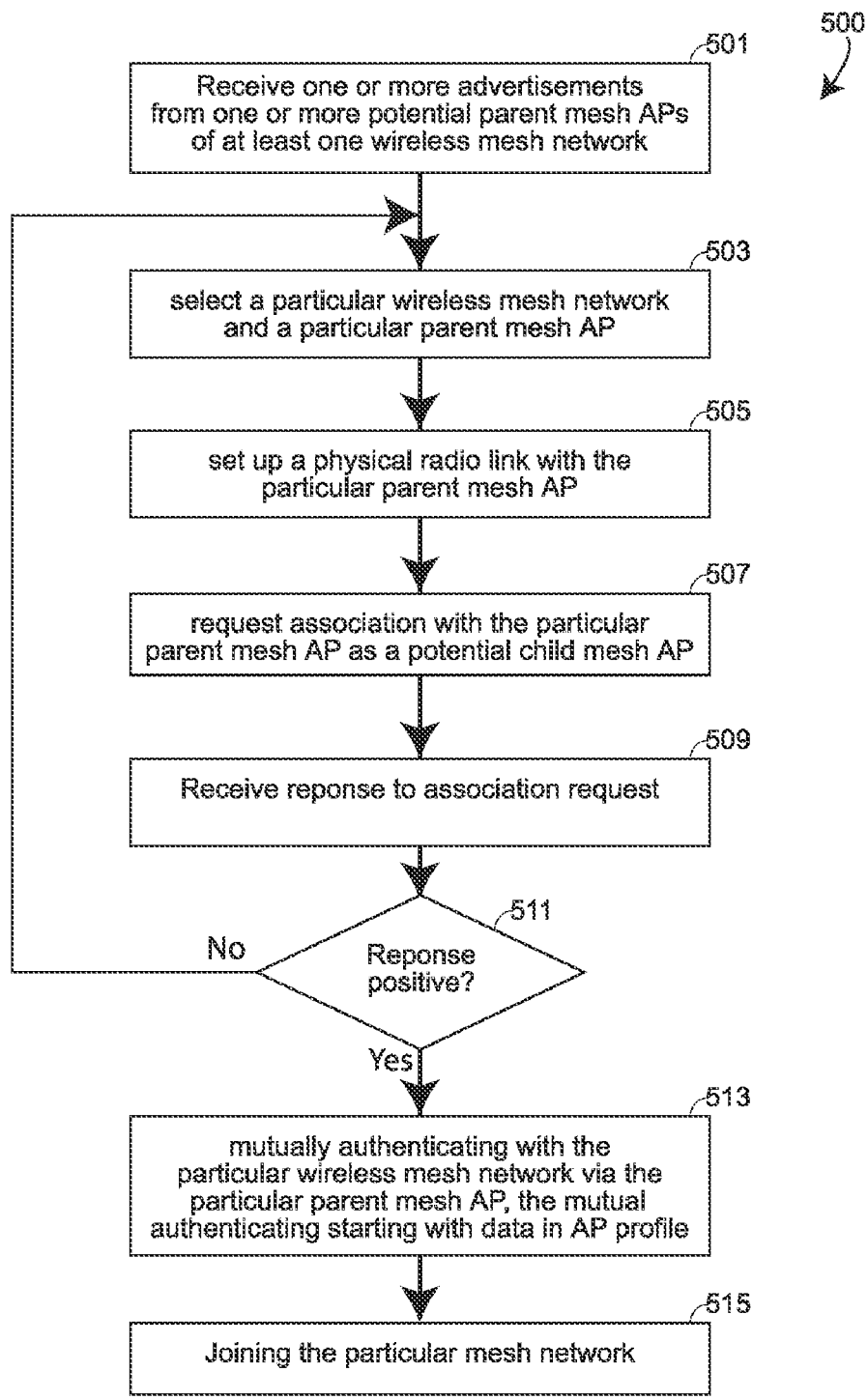
FIG. 5 shows a simplified flowchart of an embodiment of a method in a potential child mesh AP of joining an existing mesh AP.

FIG. 4 shows messaging in one embodiment of a method of a potential child mesh AP, e.g., mesh AP 105 joining an existing mesh network, e.g., mesh network 110 via a parent mesh AP, e.g., parent mesh AP 114 connected via a secure LWAPP tunnel to the controller 123 which in this case includes an AAA server. FIG. 5 shows a simplified flowchart of an embodiment of a method 500 in a potential child mesh AP such as mesh AP 105 of joining a mesh network. The mesh AP includes an AP profile 223, e.g., in non-volatile memory 221.

A potential child mesh AP such as mesh AP 105 joining an existing mesh network includes a discovery phase and an authentication phase. One embodiment of the discovery phase for a mesh AP to discover a mesh network such as networks 110, 130, 150 uses a mesh network discovery protocol according to which mesh APs that are available as potential parent APs advertise themselves using advertisements ("neighborhood advertisements") that include information on how to join the mesh network, and a potential child mesh AP receives such neighborhood advertisements and decides whether or not to join the mesh network via the mesh AP that sent the received neighborhood advertisement. Many mesh discovery protocols are known. One example is from Cisco Systems Inc. (San Jose, Calif.) and is called Adaptive Wireless Path Protocol (AWPP). AWPP uses a network discovery mechanism based on mesh APs' including mesh information in beacon frames that are regularly broadcast by the mesh APs. These are neighborhood advertisements broadcast by each mesh node that is fully-connected to a mesh network. A "full-connection" is defined as the mesh node having both an AWPP mesh link in the backhaul network and a secure LWAPP tunnel to a controller.

In one embodiment, mesh neighborhood advertisement frames, e.g., in beacon frames broadcast by a mesh AP are augmented with a mesh network identifier and one or more mesh security parameters, including information from the AP profile of the broadcasting mesh AP, e.g., from the security sub-profile. In one embodiment, this includes information on the type of authentication needed to join the network, i.e., at least one security capability supported e.g., Advanced Encryption Standard (AES) encryption (AES-CCM), IEEE 802.1X, TKIP encryption based on transient keys, and so forth.

In one embodiment, a potential child mesh AP such as mesh AP 105 desiring to discover mesh networks in the vicinity does so by passive scanning, thereby listening for mesh beacons from "fully-connected" mesh nodes, e.g., neighborhood advertisement frames from mesh APs 113, 114, 115, 117, 119, mesh APs 133, 135, 137, 139, 141, and/or mesh APs 153, 155, 157, 159, 161. Referring to FIGS. 4 and 5, in one embodiment, a potential child mesh AP in 501 receives one or more advertisements from one or more potential parent mesh APs of at least one wireless mesh network, each mesh network having a mesh network identifier. In one embodiment, the mesh AP 105 caches all routing and security parameters encoded in mesh beacons and, in 503, uses the cached information, and one or more parameters stored in the AP profile 223 to select a particular wireless mesh network to join, as characterized by a mesh network identifier, called the Mesh Domain ID herein, and a particular potential parent mesh AP within the particular wireless mesh network.

In one embodiment, a potential child mesh AP such as mesh AP 105 selects the parent mesh node using Cisco AWPP. This uses information from the AP profile 223 stored in the potential child mesh AP 105 to determine if this mesh network is one to join, if this mesh network does or can provide the required services, and so forth, and whether the selected parent AP provides the QoS and services needed. This in addition to radio parameters to ascertain that the radio link between the child mesh AP and its potential parent mesh AP has sufficient radio signal properties.

Once the potential child mesh AP 105 selects the parent mesh AP, the child mesh AP and the parent mesh AP in 505 set up the physical radio link with the selected particular parent mesh AP, which may include appropriate channel selection and synchronization.

The association phase of the mesh backhaul security protocol begins.

The association phase includes four messages that flow in between the potential child mesh AP 105, which in this case acts as the infrastructure supplicant, the parent proxy(s), including the root AP and any other mesh APs in the path to the controller that pass authentication messages, and the authenticator, which in this case is the controller. The controller is in communication with an authentication server, e.g., an AAA server that might be co-located with the controller as in mesh network 110 (see FIG. 1), or that might be separate, as in mesh network 130 (also see FIG. 1).

In one embodiment, to start the association phase, the mesh node, e.g., mesh AP 105 as infrastructure supplicant sends in 507 a Mesh Association Request message, including its security parameters needed to establish link security with its selected parent node, which acts as the parent proxy. The security parameters in one embodiment are according to information in the security sub-profile in the AP profile 223.

Suppose for this example that the mesh AP 114 in mesh network 110 is selected by mesh AP 105. The selected parent mesh AP 114 acting as parent proxy encodes all the security elements of a Mesh Association Request into a LWAPP Mesh Request message and forwards the LWAPP Mesh Request message to the controller 123 acting as authenticator, using its LWAPP tunnel to the controller 123.

The controller 123 acting as authenticator receives the LWAPP Mesh Request, performs certain first-pass validation of the potential child mesh AP 105's, i.e., the supplicant's security parameters and replies with an LWAPP Mesh Response indicating whether the supplicant's association request was successful or not.

The selected parent mesh AP 114 acting as parent proxy receives the LWAPP Mesh Response message from the controller 123 and sends a Mesh Association Response message encoding the controller 123's, i.e., the authenticator's association result in it.

The potential child mesh AP 105 acting as infrastructure supplicant in 509 receives the Mesh Association Response message from the selected parent mesh AP 114 acting as parent proxy. If the response is negative, a different mesh network and/or parent mesh AP is/are selected in 503.

Suppose in 511 the response to the association request is positive, i.e., the received response message includes a success result. The potential child mesh AP 105 proceeds to the mesh backhaul security protocol authentication phase.

With the preceding association state, both parent proxy mesh node, i.e., the selected parent mesh AP 114, and the controller 123 should entitle the infrastructure supplicant mesh node, i.e., the potential child mesh node 105 to authenticate and request for authorization to gain access as a mesh AP. Thus, in 513, in the case that the AP profile indicates that mutual authentication is required, and further that the parent mesh AP supports such mutual authentication, the mesh AP 105 mutually authenticates with the particular wireless mesh network via the particular parent mesh AP, the mutual authentication using a credential specified by the AP profile.

In more detail, on the first contact or by default configuration, the potential child mesh AP 105 acting as infrastructure supplicant mesh node goes through two cycles:
1) A certificate-based 802.1x/EAP authentication cycle with the authentication server, e.g., the AAA at the controller 123 in order to secure the communication over the air between the parent AP and the child. At the end this certificate-based cycle, both the mesh AP 105 as infrastructure supplicant mesh node and the controller 123 obtain a pairwise master key (PMK-R0). In one embodiment, the starting credential supplied by the child mesh AP 105 is specified in the security sub-profile in its AP profile 223.
2) An 802.11i 4-way handshake cycle with the controller 123, starting with the PMK-R0. At the end of which both infrastructure supplicant mesh node (child mesh node 105) and the controller 123 obtain a pairwise transient keys (PTK1) for securing all communications on a single session between the infrastructure supplicant (the new child mesh AP 105) and the parent proxy (the new parent mesh AP 114). The controller sends out the PTK1 to the parent proxy 114 once 802.11i 4-way handshake is complete so that the parent 114 and child 105 each have the PTK1. This secures all communications between this mesh node and nodes within the wide-area mesh network or the same RF/mobility domain. In one embodiment, the starting certificate supplied by the child mesh AP 105 is from the security sub-profile in its AP profile 223.

Once a child mesh node is authenticated, it may directly enter the LWAPP join phase with the controller 123 it had learned from its new parent node 114's mesh beacons, or from its AP profile. This is shown as 515: joining the selected particular mesh network in FIG. 5. Before the LWAPP Join phase is complete, the infrastructure supplicant mesh node 105 cannot accept any other mesh node as child on the backhaul network or accept any client on its access interface. Once the LWAPP Join phase is complete, the new child mesh AP 105 has a secure LWAPP tunnel to its controller 123. The mesh node 105 can only advertise mesh beacons and 802.11 beacons after completing the LWAPP phase.

After the authentication phase, one embodiment includes caching what is called a roam key, including information on the mesh domain ID and key information, at both the controller and at the child mesh AP, so that the child mesh AP can rapidly re-associate with the same parent mesh AP. In one embodiment, configuration to enable or disable the caching of the roam key is stored in the mesh profile of the mesh AP. The key itself is stored typically in memory.

Once the authentication phase is complete and the LWAPP join phase is complete, so that the child mesh AP 105 joins its chosen mesh network 110, in one embodiment, information on the mesh network 110, including how to join the mesh network and one or more characteristics, may be cached in the mesh AP for re-joining of the mesh network 110. In one embodiment, one or more of the cached information is added as part of the AP profile 223 of the mesh AP 105, including for example, the mesh domain ID of the mesh network 110. Also, in the case that rapid mesh network roaming is allowed, in some embodiments, information is cached in the mesh AP 105 for rapidly re-joining the mesh network 110 via the same parent or another parent mesh AP of the same mesh network. In one embodiment, one or more of the cached information is added in the AP profile 223 in the mesh AP 105.

Once the child mesh AP 105 has joined the mesh, it advertises its AP capabilities using beacon frames. In one embodiment, the beacon frames advertising the AP capabilities include information determined using content from the AP profile 223. One particular embodiment of the invention includes a method comprising: transmitting in a mesh access point of a wireless mesh network one or more beacon frames to advertise the mesh APs capabilities for servicing wireless clients. Each beacon frame includes one or more parameters determined from content stored in an access point profile in the mesh access point. The method includes setting up a physical radio link with a particular wireless client as a result of the particular wireless client receiving one of the beacon frames, receiving an association request from the wireless client to become of client of the mesh access point, ascertaining, e.g., using one or more parameters stored in the access point profile whether or not the wireless client can associate with mesh access point; and sending a response to the association request.

Contents of an AP Profile

The contents of an AP profile will be described assuming it is for the example mesh AP 105 described in FIG. 2. In one embodiment, an AP profile 223 is stored in the non-volatile memory 221 as a data structure including a set of one or more sub-profiles, each sub-profile itself stored as a data structure. Different embodiments include fewer or more sub-profiles.

An AP profile in a mesh AP such as mesh AP 105 includes a security sub-profile that includes such information as controller connection policies, e.g. whether the AP can join any controller, or controllers it can mutually authenticate with based on the configured validation credentials, or whether the AP can only join controllers identified by name or MAC/IP addresses. In the latter case, the security sub-profile includes one or more entries for identifying information for the specific controllers. In the case where validation credentials are used to authenticate the controller, the profile may include reference or pointers within the child mesh AP of the types of credentials that may be used to validate the controller, for example, the controller's root certificate. The security sub-profile further may include security policies, e.g., in the form of an indication, e.g., as a list of different security policies that the AP 105 can support when it services wireless clients. The security sub-profile further may include information on where to find the credentials such as certificates, username/password, key or keys, e.g., the root certificate(s) to use, for authenticating for each allowed network. In some embodiment, two references to credentials for authentication are stored: the first reference is for use in authentication for establishing the link between parent and child mesh AP and the second being the LWAPP authentication between the child mesh AP and the controller.

The AP profile may optionally include an indication, e.g., as a list of wireless mesh networks that the mesh AP has previously joined, and one or more parameters on such mesh networks. In particular, in one embodiment the mesh AP includes a list of mesh domain identifiers the mesh AP has previously joined. In one embodiment the mesh AP includes a list of mesh APs, e.g., by MAC addressed and/or by AP names the mesh AP has previously joined. In one embodiment, the AP profile include an indication of the controllers it has joined or is authorized to join.

These network access policies are provisioned in and enforced by such a child mesh AP 105 when it joins a mesh network. In addition, an AP profile optionally includes one or more access control lists to further filter which APs and controllers a child may authorize to be its parent mesh AP in a mesh network or controller respectively.

Figure 6:
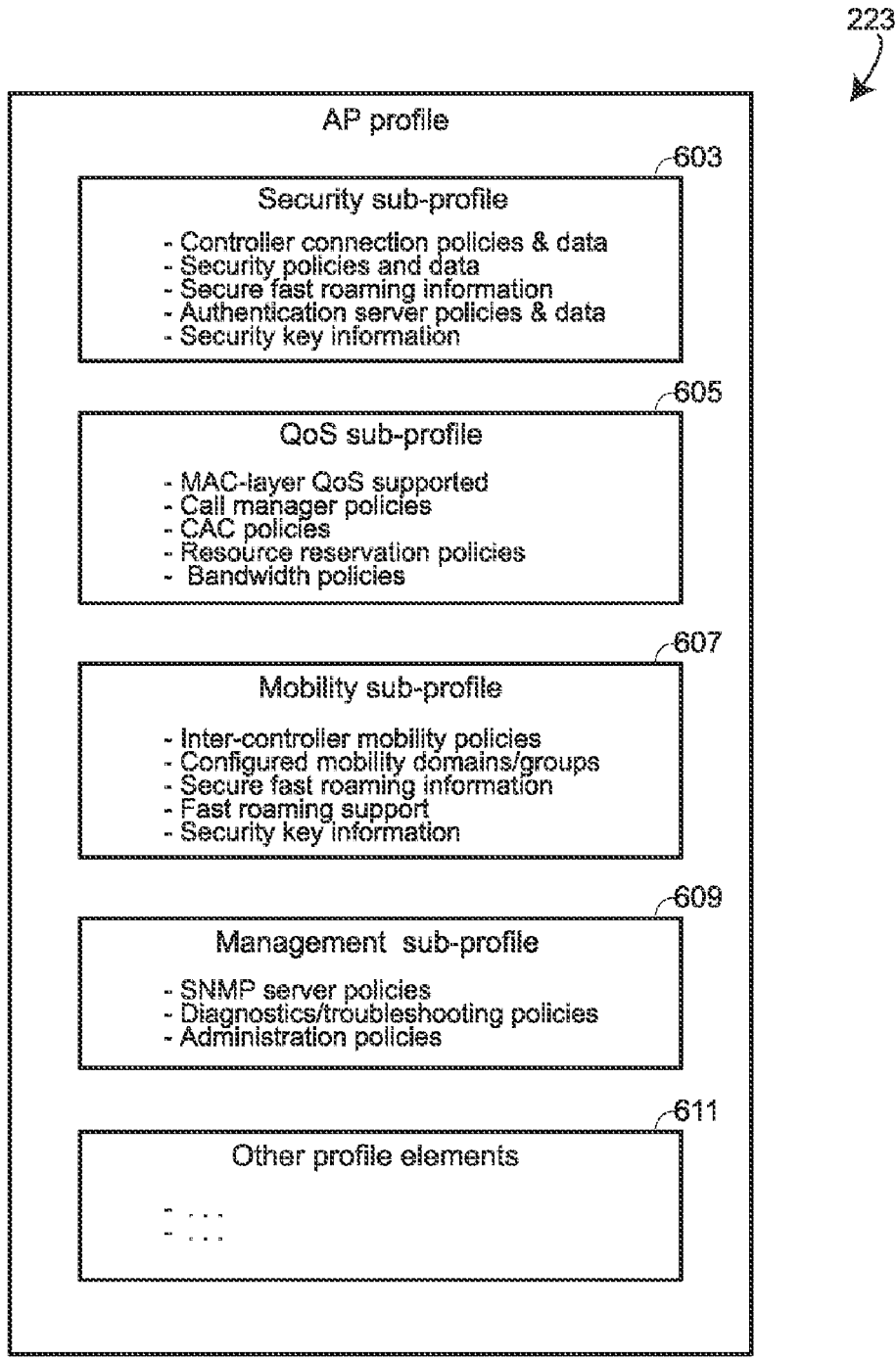
FIG. 6 shows a simple block diagram representing the data structure of an AP profile according to an embodiment of the present invention.

FIG. 6 shows a simple block diagram representing the data structure of the AP profile 223. The AP profile 223 includes in one embodiment:

1) A security sub-profile 603 for the potential mesh AP 105 including one or more entries for allowing the AP 105 to authenticate potential mesh networks, allowing a potential mesh network to identify and authenticate the potential child mesh AP, and, in one embodiment, optional authorization lists, e.g., parent mesh APs and controller lists.

Different embodiments optionally use an AP profile 223 that includes one or more of:

2) A quality of service (QoS) sub-profile 605 that includes one or more entries for describing the QoS capabilities and/or requirements of the potential mesh AP 105.
3) A mobility sub-profile 607.
4) A management sub-profile 609.
5) Other profile elements 611 such as the type of AP and/or the role the AP can play in the mesh network.

In operation, one embodiment of the mesh AP 105 includes a state machine for using information in the mesh AP profile. One implementation of the state machine is the enhanced IEEE 802.1X (or IEEE 802.11i) state machine found on wireless client stations to enable the child mesh AP act as the supplicant, using information in the AP profile to determine what mechanisms to use for the mutual authentication with a mesh network that the mesh AP wishes to join as a child mesh AP.

The logic used in the mesh AP processing can be designed by modifying the logic that is now applied to a client station joining an infrastructure network to the wireless mesh situation of a potential child mesh AP joining an existing mesh network via a selected parent mesh AP. The mesh network is identified by the mesh domain identifier.

Furthermore, a child mesh AP may further be provisioned with its own MAC-filter list of mesh parents it may "authorize" as allowed parents. Additionally, the profile may further include policies analogous to a firewall to enable the child mesh AP to authorize particular parent mesh APs only. Furthermore, a child mesh AP may further be provisioned with its own MAC-filter list of controllers it may "authorize" as allowed controllers.

The Security Sub-Profile 603

One embodiment of the security sub-profile 603 includes one or more entries for what are called controller connection policies herein, e.g. whether the AP can join any controller, or whether the AP can only join specific controllers identified by (system) name or MAC/IP addresses. If only specific controllers, the controller connection policies include data listing the controller addresses (MAC/IP) and/or names, or the credentials used to validate them.

One embodiment of the security sub-profile 603 includes one or more entries for what are called security policies for acting as a parent mesh AP for servicing potential child mesh APs herein. This includes an indication, e.g., as a list of different security policies that the mesh AP can support as a parent, e.g. Robust Security Network (RSN)—an element of 802.11i authentication, IEEE 802.11r for secure roaming, and so forth.

One embodiment of the security sub-profile 603 includes one or more entries for what are called security policies for servicing wireless clients herein. This includes an indication, e.g., as a list of different security policies that the AP can support, e.g. Robust Security Network (RSN)—an element of 802.11i authentication, IEEE 802.11r for secure roaming, and so forth.

One embodiment of the security sub-profile 603 includes one or more entries for information for fast secure roaming, e.g., secure roaming as proposed for the IEEE 802.11r standard, and/or other secure fast roaming methods. Such information includes information for roaming as a mesh node. One embodiment of the security sub-profile 603 ALSO includes one or more entries for information for supporting fast secure roaming of wireless clients.

One embodiment of the security sub-profile 603 includes one or more entries for what are called authentication server policies herein. This includes an indication, e.g., as a list of the type of authentication that the mesh AP can engage in, e.g., types of authenticators such as AAA servers that the mesh can negotiate with, e.g., a local authentication server on the controller, a separate RADIUS server, TACACS, and so forth. One embodiment of the security sub-profile 603 includes for each authentication server policy entry, the authenticator's lowest version supported.

One embodiment of the security sub-profile 603 includes one or more entries for what is called credential information herein. One embodiment of a mesh AP includes certificate chains stored in memory, e.g., in non-volatile memory 221. The security profile 603 of AP profile 223 includes an indication of which of these certificate chains are for which allowed mesh networks. In one version, the credential information includes information on where to find the credentials, key or keys to use for authentication, e.g., the root certificate(s) to use for authenticating for each allowed network. The security sub-profile 603 includes an indication, e.g., as a list of which chains to use, e.g., the root of the key chain is used to start mutual authentication for the allowed mesh networks. The root certificates of more than one key chain may be listed in the security sub-profile 603 for one or more of the allowed networks. Two types of credentials include: (1) the credential used for establishing the an IEEE 802.11 link between a child mesh AP and a parent mesh AP and the (2) the credential used to establish the LWAPP tunnel between the child mesh AP and controller. In one embodiment, this LWAPP tunnel establishing credential is a certificate. The child-parent IEEE 802.11 link establishing credential is as configured, e.g., in the AP profile, and as a default, it is a certificate.

In one embodiment, reference or pointer to a device certificate used by the manufacturer is included in the security sub-profile 603 of the AP profile 223. In one embodiment, in addition, or as an alternate, a public key infrastructure is used. That is, rather (or in addition to) relying on the manufacturing device certificate, one of many other certificates may be provisioned that have been rooted by the specific mesh domain network's certificate authority. In one such embodiment, a certification server acts as a certificate authority for the mesh network and includes public keys of at least one PKI. In such an embodiment, the AP profile 223, in particular, the security sub-profile 603 includes one or more entries for information on the one or more mesh network specific certificate and their respective certificate authorities.

The Quality of Service (QoS) Sub-Profile 605

Some embodiments of the AP profile 223 include one or more entries for a Quality of Service (QoS) sub-profile 605.

In one embodiment, the QoS sub-profile 605 includes one or more entries for the MAC-layer QoS levels supported in the form of an indication, e.g., as a list of different QoS levels supported at the MAC level, e.g., EDCA/HCCA, and so forth.

In one embodiment, the QoS sub-profile 605 includes one or more entries for what are called herein the call manager policies, e.g., in the form of an indication, e.g., as a list of which session management protocols are supported by the mesh AP 105, e.g., Skinny, SIP, /MGCP, and so forth.

In one embodiment, the QoS sub-profile 605 includes one or more entries for what are called herein the call admission control (CAC) policies when servicing wireless clients, e.g., in a form of an indication, e.g., as a list of the type of CAC methods supported by the mesh AP 105, e.g., static CAC, dynamic CAC, or static CAC only, and so forth. As would be known to those in the art, in contrast to static CAC, dynamic CAC methods use on-line measurements of the actual load in the network, and hence can achieve much higher utilization.

In one embodiment, the QoS sub-profile 605 includes one or more entries for what are called herein the resource reservation policies when servicing wireless clients, e.g., in the form of an indication, e.g., as a list of what policies are supported for reserving bandwidth, e.g. RSVP, Boomerang, ST2, methods as described in the proposed IEEE 802.11r standard, and so forth.

In one embodiment, the QoS sub-profile 605 includes one or more entries for what are called herein the bandwidth policies when servicing wireless clients, e.g., in the form of an indication, e.g., as a list of what policies are supported for enforcing bandwidth. Different policy methods are known to deal with what happens when there is no more bandwidth, and also how to enforce policy, e.g., that a bandwidth policy is to use a particular bandwidth server, or have rate ceilings, and so forth. Many such bandwidth policy methods are known, and in one embodiment, the QoS sub-profile 605 one or more entries for listing which are available for this particular mesh AP 105.

The Mobility Sub-Profile 607

Some embodiments of the AP profile 223 include one or more entries for a mobility sub-profile 607.

In one embodiment, the mobility sub-profile 607 includes one or more entries for what is called herein inter-controller mobility policies, e.g. whether mobility is supported to any controller, or to controllers that have been pre-configured.

In one embodiment, the mobility sub-profile 607 includes one or more entries for a list or other indication of the configured mobility domains/groups of mesh networks for key distribution for mesh formation. Also included are, for example, for each such domain/group, whether IEEE 802.11r-like fast authentication is supported for mobility, or full authentication is required.

In one embodiment, the mobility sub-profile 607 includes one or more entries for a list or other indication of the configured mobility domains/groups for key distribution of clients moving within an RF mobility domain. Also included are, for example, for each such domain/group, whether IEEE 802.11r-like fast authentication is supported for mobility, or full authentication is required.

The Management Sub-Profile 609

Some embodiments of the AP profile 223 include one or more entries for a management sub-profile 609.

In one embodiment, the management sub-profile 609 includes one or more entries for what are called herein SNMP server policies, e.g., versions of SNMP supported, supported security levels, and so forth.

In one embodiment, management sub-profile 609 includes one or more entries for what are called herein diagnostics/troubleshooting policies, e.g., provision for remote login, console support, remote power cycling, active and passive probing, and so forth.

In one embodiment, management sub-profile 609 includes one or more entries for what are called herein administration policies, e.g., information on the password to change configuration of the mesh AP 105, and so forth.

The Miscellaneous Sub-Profile 611

Some embodiments of the AP profile 223 include one or more entries for another so-called "miscellaneous" sub-profile 611 for other information, e.g., other network policies which the AP should enforce while connecting to the network The AP profile may additionally include one or more entries for the following parameters so that different profiles can be applied to different devices according to their roles and/or services by the network:

1) AP type, e.g. regular, outdoor, h-reap, bridge.
2) AP role, e.g. root AP, mesh AP, parent mesh AP, bridged mesh AP, and so forth.

Deployment and Default Profiles

According to one embodiment of the invention, an AP ships from a factory with a default AP profile that describes one or more default policies. In one embodiment, the default AP profile is sufficient to support zero-touch configurations using wildcard entries. While one version supports a default profile containing a single set of one or more default policies. Other versions include different default policies for different markets, e.g., according to their security needed, such as Enterprise, Service Provider, Commercial, and so forth.

Thus, every device starts with a default profile. In one alternative, a customer may order mesh AP devices configured at the factory with a default profile chosen from a plurality of default profiles that are flashed into a non-volatile memory of the devices prior to shipping. In one such alternate embodiment, a customer orders devices online over a network, e.g., over the Internet using an online order form that includes which of the plurality of default AP profiles each mesh AP device is to be delivered.

Thus, in one embodiment, the mesh AP device includes a default AP profile maintained in a memory, e.g., a non-volatile memory, also called a flash memory, shown as non-volatile memory 221 in the mesh AP of FIG. 2, in which the AP profile is shown as AP profile 223.

A security sub-profile 603 in an AP profile includes one or more entries for parameters, and a default AP profile 223 includes default parameters.

In one embodiment, prior to deployment, a user, e.g., an enterprise wishing to deploy some mesh AP devices can prime a mesh AP device that is a lightweight mesh AP by connection to a controller, e.g., via the network interface 215 in the mesh AP of FIG. 2. In a non-controller environment, there may be other administrator tools to "push" the profiles to all the mesh APs, or they are manually configured prior to deployment. Priming includes selecting one of a set of pre-defined AP profiles. An administrator selects an AP profile from the set of predefined profiles, and the mesh AP downloads the selected pre-defined profile's parameters. In the case of lightweight mesh APs, the controller uploads the selected pre-defined profile parameters to the mesh AP, and the mesh AP updates the stored default AP's parameters to the selected pre-defined AP profile's parameters.

In one embodiment, in addition, or as an alternate, an administrator can customize an AP profile prior to deployment by editing one or more parameters of the default AP profile or selected pre-defined AP profile.

In addition, one embodiment includes updating the AP profile when the mesh AP connects to a controller, e.g., as part of a mesh network.

In one embodiment, while the default AP profile is usable "out-of-the-box," an AP cannot continue to be of service in a mesh network until it is re-configured with appropriate profile parameters for a given mesh network from the parent mesh AP, or the controller of the parent mesh AP in the case of a lightweight mesh AP. Once it has the appropriate profile configured, the profile can only be changed within the limits of current profile, i.e. by administrative password, etc. Thus, in a well configured network, where AP profiles are enforced, the default AP profile may typically be used for bootstrapping the appropriate profile for the particular mesh AP. In one example, the factory-installed out-of-box default profile may be used to signal the parent mesh AP, e.g., the controller of the parent mesh AP in a lightweight mesh AP configuration, that the child mesh AP should be configured with the appropriate profile parameters.

One embodiment of the invention includes configuring wireless access points that are potential child mesh APs by configuring mesh network IDs and other information to limit the potential child mesh AP's ability to join only certain mesh networks.

One embodiment of the invention includes configuring wireless access points that might be parent mesh APs in a wireless mesh network using profiles to enable a potential parent mesh AP to provide network service to potential child mesh APs. Such an AP profile for a potential mesh AP includes a mesh network identifier and a set of capabilities such as security parameters for mutual authentication, QoS parameters and layer-2 radio parameters. Such parameters also include the ability to authenticate not only a potential child mesh AP with the AP acting as parent, but further to mutually authenticate the potential child mesh AP with the mesh network.

One embodiment of the invention includes storing parameters in a data structure called an AP profile that provides for the AP to mutually authenticate with a mesh network.

In one embodiment, a computer-readable carrier medium carries a set of instructions that when executed by one or more processors of a mesh AP cause the one or more processors to carry out a method in the mesh AP of authenticating and otherwise using the parameters in the AP profile.

It should be appreciated that although the invention has been described in the context of mesh networks that conform to the IEEE 802.11 standard, the invention is not limited to such contexts and may be utilized in various other applications and systems.

Note also that while much of the description is for a mesh access point that is a lightweight mesh access point that required connection to a controller for full operation, the invention is also applicable to full-function access points. The functions of the controller that control the mesh AP would then be in the AP controller. Authentication to join a mesh would be with the potential parent mesh AP, and typically with an authentication sever, e.g., AAA server that is in the network.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

Furthermore, while the term mesh AP does not necessitate the device being used as the access point for an infrastructure wireless network. A mesh AP may operate as a mesh node in the mesh network without necessarily providing AP services to client stations. For example, a mesh AP can simply operate as a relay mesh node for the backhaul mesh network.

Furthermore, while FIG. 2 shows a mesh AP that includes two separate radios, e.g., one to operate in the 2.4 GHz band, and the other in the approximately 5 GHz band, a mesh AP can operate with a single physical radio interface.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of a mesh AP. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing a set of instructions for execution by one or more of the processors and that cause the one or more processors to perform any one or more of the methodologies of the present invention. A carrier medium may take many forms, including but not limited to, non-volatile media, and volatile media. Non-volatile media includes, for example, optical, magnetic disks, and magneto-optical disks. Volatile media includes dynamic memory, such as main memory. For example, the term "carrier medium" shall accordingly be taken to include, but not be limited to, solid-state memories, and a computer product embodied in optical and magnetic media.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:
1. A method comprising:
(A) receiving in a mesh access point one or more advertisements from one or more potential parent mesh access points of at least one wireless mesh network, each mesh network having a mesh network identifier and controlled by a mesh network controller, each advertisement including the mesh network identifier; and
wherein the access point includes non-volatile memory in which an access point profile data structure is stored, the access point profile data structure being pre-configured, prior to joining any wireless mesh network, with a plurality of sub-profiles, such that the mesh access point is able to join a mesh network controlled by a controller using information in the pre-defined sub-profiles, the pre-defined sub-profiles including two or more of:
a security sub-profile data structure including at least one parameter that provides security information related to the mesh access point, the at least one parameter in the security sub-profile data structure including an indication of whether or not mutual authentication is required, and in the case the indication is that mutual authentication is required, credential information to use in mutual authentication,
one or more initial radio parameters to use,
a quality of service (QoS) sub-profile that includes one or more entries for describing one or more QoS capabilities and/or QoS requirements of the mesh access point,
a mobility profile that includes one or more entries defining mobility policies,
a management sub-profile including one or more entries for one or more of: what versions of simple network management protocol (SNMP) are supported, diagnostic and/or troubleshooting policies, whether remote login is supported, whether console support is enabled, whether remote power cycling is enabled, whether active probing is enabled, and whether passive probing is enabled, and
an additional sub-profile including one or more entries to indicate one or more of what mesh role or roles and what access point role or roles the mesh access point can undertake,
the method further comprising:
(B) selecting by the mesh access point a particular wireless mesh network controlled by a particular controller, and a particular parent mesh access point of the particular wireless mesh network, the selecting using one or more parameters stored in the access point profile,
(C) setting up a physical radio link with a particular parent mesh access point as a child mesh access point;

(D) requesting association with the particular parent mesh access point as a potential child mesh access point of the particular parent mesh access point, the requesting using one or more parameters in the access point profile data structure, including one or more parameters in the security sub-profile data structure;
(E) receiving a response to the association request; and
(F) in the case that the received response is positive, using one or more policies stored in the access point profile data structure to join the particular wireless mesh network via the particular parent mesh access point; and after joining the particular mesh network, transmitting from the mesh access point advertisements to indicate the mesh access point's access point capabilities,
wherein in the case the indication is that mutual authentication is required, the using one or more policies to join includes mutual authenticating with the mesh access point as supplicant, starting with credential information stored in the security sub-profile of the access point profile data structure.

2. A method as recited in claim 1, wherein the one or more parameters in the security sub-profile data structure include an indication of whether or not mutual authentication is required, and in the case the indication is that mutual authentication is required, the using one or more policies to join includes mutual authenticating starting with credential information stored in the security sub-profile of the access point profile data structure.

3. A method as recited in claim 1, wherein the access point profile data structure includes one or more entries for an indication of which wireless mesh networks the mesh access point is authorized to join and one or more parameters on such authorized mesh networks.

4. A method as recited in claim 1, wherein the access point profile data structure includes one or more entries for an indication of wireless mesh networks that the mesh access point has previously joined, and one or more parameters on such previously joined mesh networks.

5. A method as recited in claim 1, wherein the selecting of the particular wireless mesh network and the particular parent mesh access point include using information from the access point profile data structure to ascertain if the particular wireless mesh network and a particular parent mesh access point is in an authorized mesh network and can provide the services required.

6. A method as recited in claim 1, wherein one or more of the mesh nodes of the mesh network are lightweight access points whose respective access point functionalities are controlled by one or more controllers that are in communication with the respective lightweight access points using a pre-defined lightweight access point protocol, and wherein the access point profile data structure includes one or more entries for an indication of whether the mesh access point can join any controller, or whether the mesh access point can only join only one or more controllers identified in the access point profile data structure.

7. A method as recited in claim 1, wherein the security sub-profile data structure of the access point profile data structure includes one or more entries for an indication of one or more different security policies that the mesh access point can support.

8. A method as recited in claim 1, wherein the access point profile data structure includes one or more entries for information for fast secure roaming that the mesh access point can support.

9. A method as recited in claim 1, wherein the security sub-profile data structure of the access point profile data structure includes one or more entries for an indication of one or more different types of authentication that the mesh access point can engage in for joining a mesh network.

10. A method as recited in claim 1, wherein the access point profile data structure includes one or more entries for Quality of Service (QoS) information for the mesh access point.

11. A method as recited in claim 10, wherein the Quality of Service information includes the one or more QoS levels supported by the mesh access point.

12. A method as recited in claim 10, wherein the Quality of Service information includes an indication of which one or more types of call admission control methods are supported by the mesh access point.

13. A method as recited in claim 1, wherein the access point profile data structure is pre-configured with one or more default parameters.

14. A method as recited in claim 1, wherein the mesh access point is a lightweight access point that can be coupled to a controller to have access point capabilities controlled by the controller by communication between the lightweight access point and the controller according to a pre-defined lightweight access point protocol, and wherein the access point profile data structure is configurable once the mesh access point is coupled to a controller, including at least one of the default parameters being changeable.

15. A method comprising:
transmitting in a mesh access point of a wireless mesh network one or more advertisements for potential child mesh access points, the mesh network having a mesh network identifier and controlled by a mesh network controller, each advertisement including the mesh network identifier and one or more parameters determined from content stored in an access point profile data structure stored in non-volatile memory included in the mesh access point, the access point profile data structure being pre-configured prior to joining any mesh network with a plurality of sub-profiles, such that the mesh access point is able to join a mesh network controlled by a controller using information in the pre-defined sub-profiles, the pre-defined sub-profiles including two or more of:
a security sub-profile data structure including at least one parameter that provides security information related to the mesh access point, the at least one parameter in the security sub-profile data structure including an indication of whether or not mutual authentication is required, and in the case the indication is that mutual authentication is required, credential information to use in mutual authentication,
one or more initial radio parameters to use,
a quality of service (QoS) sub-profile that includes one or more entries for describing one or more QoS capabilities and/or QoS requirements of the mesh access point,
a mobility profile that includes one or more entries defining mobility policies,
a management sub-profile including one or more entries for one or more of: what versions of simple network management protocol (SNMP) are supported, diagnostic and/or troubleshooting policies, whether remote login is supported, whether console support is enabled, whether remote power cycling is enabled, whether active probing is enabled, and whether passive probing is enabled, and
an additional sub-profile including one or more entries to indicate one or more of what mesh role or roles and what access point role or roles the mesh access point can undertake;

setting up a physical radio link with a particular child mesh access point as a result of the particular child mesh access point receiving one of the advertisements;

receiving an association request from the particular child mesh access point as a potential child mesh access point of the mesh access point;

ascertaining, using one or more parameters stored in the access point profile data structure whether or not the child mesh access point can and should join the mesh network with the mesh access point being the parent mesh access point of the particular child mesh access point; and sending a response to the association request, wherein the mesh access point is a lightweight mesh access point having a secure tunnel with a controller and whose access point functionality is controlled by the controller, the secure tunnel using a pre-defined lightweight access point protocol, and wherein the method further comprises:

in the case the mesh access point ascertains that the child mesh access point can join the mesh network, sending a controller association request to the controller and receiving a controller response to the controller association request as a result of the controller ascertaining whether or not the child mesh access point can join the mesh network;

in the case that the response is positive, mutually authenticating with the particular child mesh access point, starting with the child mesh access point as supplicant and the controller as authenticator.

16. An apparatus comprising:

at least a backhaul radio interface;

a control processor coupled to the backhaul radio interface operative with the radio interface to connect as a mesh access point to one or more mesh nodes to form a wireless mesh network;

a non-volatile memory coupled to or residing in the control processor, and usable by the control processor, the non volatile memory configured with an access point profile data structure configured to store one or more parameters, the access point profile data structure pre-configured, prior to the apparatus joining any wireless mesh network as a mesh access point, with a plurality of sub-profiles, such that the apparatus is able to join a mesh network controlled by a controller using information in the pre-defined sub-profiles, the pre-defined sub-profiles including two or more of:

a security sub-profile data structure that provides security information usable by the processor to authenticate the apparatus in the process of joining a particular mesh network as a mesh access point that is a child mesh access point to a particular parent mesh access point, the security sub-profile data structure including at least one parameter comprising an indication of whether or not mutual authentication is required, and in the case the indication is that mutual authentication is required, credential information to use in mutual authentication, one or more initial radio parameters to use, a quality of service (QoS) sub-profile that includes one or more entries for describing one or more QoS capabilities and/or QoS requirements of the mesh access point, a mobility profile that includes one or more entries defining mobility policies, a management sub-profile including one or more entries for one or more of: what versions of simple network management protocol (SNMP) are supported, diagnostic and/or troubleshooting policies, whether remote login is supported, whether console support is enabled, whether remote power cycling is enabled, whether active probing is enabled, and whether passive probing is enabled, and an additional sub-profile including one or more entries to indicate one or more of what mesh role or roles and what access point role or roles the mesh access point can undertake;

wherein the control processor is configured to select a particular wireless mesh network controlled by a particular controller, and a particular parent mesh access point of the particular wireless mesh network, the selecting using one or more parameters stored in the access point profile, set up a physical radio link with a particular parent mesh access point as a child mesh access point;

request association with the particular parent mesh access point as a potential child mesh access point of the particular parent mesh access point, the requesting association using one or more parameters in the access point profile data structure, including one or more parameters in the security sub-profile data structure;

receive a response to the association request; and in the case that the received response is positive, use one or more policies stored in the access point profile data structure to join the particular wireless mesh network via the particular parent mesh access point; and after joining the particular mesh network, wirelessly transmit advertisements to indicate the apparatus's access point capabilities, wherein in the case the indication is that mutual authentication is required, the using one or more policies to join includes mutual authenticating with the apparatus as supplicant, starting with credential information stored in the security sub-profile of the access point profile data structure.

17. An apparatus as recited in claim 16, further comprising:

a wired network interface coupled to or residing in the control processor, and operable to couple the apparatus to a wired network.

18. An apparatus as recited in claim 16, wherein the apparatus is operable as a lightweight mesh access point when coupled to a controller, the apparatus's access point functionality being controlled by the controller in communication with the apparatus using a pre-defined lightweight access point protocol.

19. An apparatus as recited in claim 18, wherein the access point profile data structure includes information on whether the mesh access point can join any controller, or whether the access point can only join one or more identified controllers.

20. An apparatus as recited in claim 16, wherein the access point profile data structure is pre-configured with one or more default parameters.

21. An apparatus as recited in claim 20, wherein the apparatus is operable as a lightweight mesh access point when coupled to a controller to have access point capabilities controlled by the controller by communication between the lightweight access point and the controller according to a pre-defined lightweight access point protocol, and wherein the access point profile data structure is configurable once the mesh access point is coupled to a controller, including at least one of the default parameters being changeable.

22. An apparatus as recited in claim 16, wherein the security sub-profile data structure of the access point profile data structure includes one or more entries for one or more different security policies that the mesh access point can support.

23. An apparatus as recited in claim 16, wherein the access point profile data structure includes one or more entries for an indication of allowed and/or not-allowed wireless mesh networks that the mesh network may and/or may not join.

24. An apparatus as recited in claim 23, wherein whether a particular mesh network is allowed or not is ascertained from one or more parameters stored in the access point profile data structure.

25. An apparatus as recited in claim 16, wherein the security sub-profile data structure of the access point profile data structure includes one or more entries for credential information on where to find the credential or credentials for authenticating with the particular wireless mesh network.

26. An apparatus as recited in claim 16, wherein the access point profile data structure includes one or more entries for an indication of wireless mesh networks that the mesh access point has previously joined.

27. A tangible computer-readable storage medium on which is encoded logic for execution and when executed configured to:
    receive in a mesh access point one or more advertisements from one or more potential parent mesh access points of at least one wireless mesh network, each mesh network having a mesh network identifier and being controlled by a mesh network controller, each advertisement including the mesh network identifier;
    wherein the computer-readable storage medium further comprises non-volatile memory in which an access point profile data structure is stored, the access point profile data structure being pre-configured, prior to joining any wireless mesh network, with a plurality of sub-profiles, such that the mesh access point is able to join a mesh network controlled by a controller using information in the pre-defined sub-profiles, the pre-defined sub-profiles including two or more of:
        a security sub-profile data structure including at least one parameter that provides security information related to the mesh access point, the at least one parameter in the security sub-profile data structure including an indication of whether or not mutual authentication is required, and in the case the indication is that mutual authentication is required, credential information to use in mutual authentication, one or more initial radio parameters to use,
        a quality of service (QoS) sub-profile that includes one or more entries for describing one or more QoS capabilities and/or QoS requirements of the mesh access point,
        a mobility profile that includes one or more entries defining mobility policies,
        a management sub-profile including one or more entries for one or more of: what versions of simple network management protocol (SNMP) are supported, diagnostic and/or troubleshooting policies, whether remote login is supported, whether console support is enabled, whether remote power cycling is enabled, whether active probing is enabled, and whether passive probing is enabled, and
        an additional sub-profile including one or more entries to indicate one or more of what mesh role or roles and what access point role or roles the mesh access point can undertake,
    wherein the logic when executed is further configured to:
        select for the mesh access point a particular wireless mesh network and a particular parent mesh access point of the particular wireless mesh network, the selecting using one or more parameters stored in an access point profile data structure set up a physical radio link between the mesh access point and a particular parent mesh access point for the mesh access point to be a child mesh access point;
        request association of the mesh access point with the particular parent mesh access point as a potential child mesh access point of the particular parent mesh access point, the requesting using one or more parameters in the access point profile data structure, including one or more parameters in the security sub-profile data structure;
        receive at the mesh access point a response to the association request; and
        in the case that the received response is positive, use one or more policies stored in the access point profile data structure to cause the mesh access point to join the particular wireless mesh network via the particular parent mesh access point; and after joining the particular mesh network, transmitting from the mesh access point advertisements to indicate the mesh access point's access point capabilities,
    wherein in the case the indication is that mutual authentication is required, the using one or more policies to join includes mutual authenticating with the mesh access point as supplicant, starting with credential information stored in the security sub-profile of the access point profile data structure.

28. A tangible computer-readable storage medium as recited in claim 27, wherein the one or more policies include an indication of whether or not mutual authentication is required, and in the case the indication is that mutual authentication is required, the using one or more policies to join includes mutual authenticating starting with credential information stored in the security sub-profile of the access point profile data structure.

29. An apparatus comprising:
    means for receiving a wireless signal transmitted by a transmitting mesh access point in a particular wireless mesh network, including receiving one or more advertisements advertising the transmitting mesh access point's availability to act as a parent mesh access point for a wireless mesh network;
    means for processing signals received, the means for processing configured, together with the means for receiving to connect to a mesh node of a wireless mesh network as a child node the connected-to mesh node as a result of receiving an advertisement from the connected-to mesh node; and
    non-volatile memory means coupled to or residing in the control processor for storing one or more parameters in a mesh access point data structure, the access point profile data structure pre-configured, prior to the apparatus joining any wireless mesh network as a mesh access point, with a plurality of sub-profiles, such that the apparatus is able to join a mesh network controlled by a controller using information in the pre-defined sub-profiles, the pre-defined sub-profiles including two or more of:
        a security sub-profile data structure containing one or more parameters usable by the means for processing to authenticate the apparatus in the process of joining a particular mesh network as a mesh access point that is a child mesh access point to a particular mesh access point as the child's mesh access point's parent mesh access point as a result of receiving an advertisement from the particular mesh access point, the security sub-profile data structure comprising at least one parameter including an indication of whether or not mutual authentication is required, and in the case the indication is that mutual authentication is required, credential information to use in mutual authentication, one or more initial radio parameters to use, a quality of service (QoS) sub-profile that includes one or more entries for describing one or more QoS capabilities and/or QoS requirements of the mesh access point, a mobility profile that includes one or more entries defining mobility policies, a management sub-profile including one or more entries for one or more of: what versions of simple network management protocol (SNMP) are supported, diagnostic and/or troubleshooting policies, whether remote login is supported, whether console support is enabled, whether remote power cycling is enabled, whether active probing is enabled, and whether passive probing is enabled, and an additional sub-profile including one or more entries to indicate one or more of what mesh role or roles and what access point role or roles the mesh access point can undertake, wherein the means for processing is configured to select a particular wireless mesh network controlled by a particular controller, and a particular parent mesh access point of the particular wireless mesh network, the selecting using one or more parameters stored in the access point profile, set up a physical radio link with a particular parent mesh access point as a child mesh access point;

request association with the particular parent mesh access point as a potential child mesh access point of the particular parent mesh access point, the requesting association using one or more parameters in the access point profile data structure, including one or more parameters in the security sub-profile data structure;

receive a response to the association request; and in the case that the received response is positive, use one or more policies stored in the access point profile data structure to join the particular wireless mesh network via the particular parent mesh access point; and after joining the particular mesh network, wirelessly transmit advertisements to indicate the apparatus's access point capabilities, wherein in the case the indication is that mutual authentication is required, the using one or more policies to join includes mutual authenticating with the apparatus as supplicant, starting with credential information stored in the security sub-profile of the access point profile data structure.

* * * * *